United States Patent
Runyon

(10) Patent No.: US 10,728,873 B2
(45) Date of Patent: Jul. 28, 2020

(54) ELECTRONIC IDENTIFICATION BADGE WITH LOCATION TECHNOLOGY

(71) Applicant: Intel Corporation, Santa Clara, CA (US)

(72) Inventor: Jeff Runyon, Queen Creek, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/979,977

(22) Filed: May 15, 2018

(65) Prior Publication Data

US 2019/0045478 A1 Feb. 7, 2019

Related U.S. Application Data

(60) Provisional application No. 62/558,600, filed on Sep. 14, 2017.

(51) Int. Cl.
| | |
|---|---|
| *H04W 64/00* | (2009.01) |
| *G06K 19/07* | (2006.01) |
| *H04W 4/021* | (2018.01) |
| *H04W 4/029* | (2018.01) |
| *H04W 4/33* | (2018.01) |
| *H04B 1/3827* | (2015.01) |
| *G06F 1/16* | (2006.01) |

(52) U.S. Cl.
CPC ...... *H04W 64/003* (2013.01); *G06K 19/0723* (2013.01); *H04W 4/021* (2013.01); *H04W 4/029* (2018.02); *H04W 4/33* (2018.02); *G06F 1/163* (2013.01); *H04B 1/385* (2013.01)

(58) Field of Classification Search
CPC ......... H04W 4/02; H04W 4/80; H04W 4/021; H04W 4/04; H04W 4/30; H04W 4/33; H04W 4/023; H04W 64/00; H04W 4/025; H04W 4/029; G06F 21/34; G06F 21/35; G07C 1/00; G07C 9/00007; G07C 9/00111; H04L 67/18; H04L 67/22
See application file for complete search history.

(56) References Cited

U.S. PATENT DOCUMENTS

| | | | | |
|---|---|---|---|---|
| 7,715,593 | B1 * | 5/2010 | Adams | G06Q 20/327 340/5.53 |
| 10,009,726 | B2 * | 6/2018 | Roy | H04W 4/023 |
| 2008/0310850 | A1 * | 12/2008 | Pederson | G07C 9/00158 398/135 |
| 2013/0229263 | A1 * | 9/2013 | Graczyk | G01S 1/70 340/10.1 |

(Continued)

OTHER PUBLICATIONS

"Aeroscout", extronics.com/aeroscout/, Retrieved on Apr. 5, 2018, 4 pages.
"Clearview", versustech.com/clearview/, 2 pages.

*Primary Examiner* — Nam T Huynh
(74) *Attorney, Agent, or Firm* — Jordan IP Law, LLC

(57) ABSTRACT

An embodiment of a semiconductor package apparatus may include technology to determine if one or more co-located radio transmitters and radio receivers are in a tracked area, enable an active tracking mode if one or more of the co-located radio transmitters and radio receivers are determined to be in the tracked area, and periodically transmit identification information from at least one of the radio transmitters if the active tracking mode is enabled. Other embodiments are disclosed and claimed.

21 Claims, 12 Drawing Sheets

(56) References Cited

U.S. PATENT DOCUMENTS

2016/0050202 A1\* 2/2016 Swallow ............ H04L 63/0853
726/9
2017/0228953 A1\* 8/2017 Lupovici ............ G07C 9/00309

\* cited by examiner

FIG. 10A  FIG. 10B

ELECTRONIC IDENTIFICATION BADGE WITH LOCATION TECHNOLOGY

CROSS REFERENCE RELATED APPLICATIONS

This application claims benefit of U.S. Provisional Patent Application No. 62/558,600 filed Sep. 14, 2017.

TECHNICAL FIELD

Embodiments generally relate to identification badges. More particularly, embodiments relate to an electronic identification badge with location technology.

BACKGROUND

Identification badges used by corporations and governments may be non-intelligent. They may be encoded with a unique identifier (credential #) and a key that allows the data to be transmitted to devices like security access control badge readers. Moreover, the use of smart phones running applications may be expensive and impractical. For example, the phone may need to be out of the holster, unlocked and the applications running for them to work with devices like security access control badge readers.

BRIEF DESCRIPTION OF THE DRAWINGS

The various advantages of the embodiments will become apparent to one skilled in the art by reading the following specification and appended claims, and by referencing the following drawings, in which:

FIGS. 10A to 10C are respective front, side, and bottom views of an example of another electronic identification badge according to an embodiment;

DESCRIPTION OF EMBODIMENTS

Figure 1:
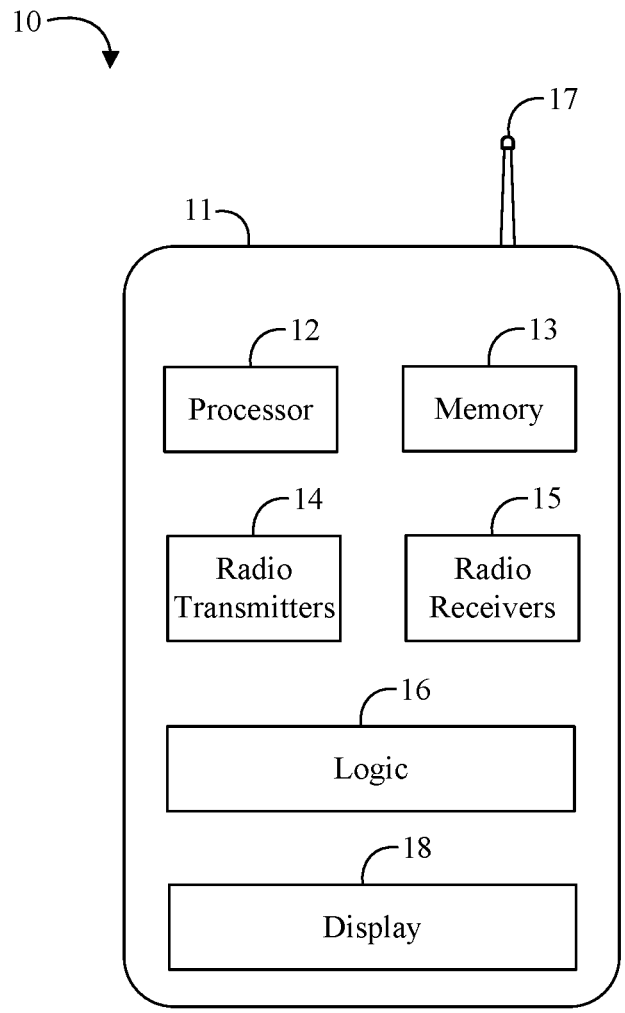
FIG. 1 is a block diagram of an example of an electronic identification badge according to an embodiment.

Turning now to FIG. 1, an embodiment of an electronic identification badge 10 may include a housing 11 having a card form factor, a processor 12 positioned within the housing 11, memory 13 positioned within the housing 11 and communicatively coupled to the processor 12, one or more radio transmitters 14 positioned within the housing 11 and communicatively coupled to the processor 12, one or more radio receivers 15 positioned within the housing 11 and communicatively coupled to the processor 12, and logic 16 positioned within the housing 11 and communicatively coupled to the processor 12 to determine if one or more of the radio transmitters and the radio receivers are in a tracked area, enable an active tracking mode if one or more of the radio transmitters and the radio receivers are determined to be in the tracked area, and periodically transmit identification information from at least one of the radio transmitters if the active tracking mode is enabled. The badge 10 may further include an antenna 17 positioned within or affixed to housing 11 and communicatively coupled to the one or more radio transmitters 14 and receivers 15. Some embodiments of the badge 10 may also include a display 18 affixed to the housing 11 and communicatively coupled to the processor 12 to display a name and image of a user associated with the identification information. The user may generally be a person, but may also be a robot, a drone, an autonomous vehicle, etc.

In some embodiments, the logic 16 may be further configured to disable the active tracking mode if one or more of the radio transmitters 14 and the radio receivers 15 are determined to not be in the tracked area, place the processor 12, memory 13, radio transmitters 14, and radio receivers 15 in a sleep mode when the active tracking mode is disabled, and periodically wake from the sleep mode to determine if one or more of the radio transmitters 14 and the radio receivers 15 are in the tracked area. For example, the logic 16 may also be configured to wake from the sleep mode in response to a read event to determine if one or more of the radio transmitters 14 and the radio receivers 15 are in a tracked area. In some embodiments, the logic 16 may be further configured to periodically store time information and external transmitter information received by one or more of the radio receivers 15 if the active tracking mode is enabled. For example, the radio transmitters 14 and receivers 15 may include one or more of a WIFI radio, a Global Positioning System (GPS) receiver, a cellular radio, and a radio frequency identifier (RFID) tag. In some embodiments, the transmitters 14, receivers 15, and/or the logic 16 may be located in, or co-located with, various components, including the processor 12 (e.g., on a same die).

Embodiments of each of the above processor 12, memory 13, transmitters 14, receivers 15, logic 16, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 13, persistent storage media, or other system memory may store a set of instructions which when executed by the processor 12 cause the badge 10 to implement one or more components, features, or aspects of the badge 10 (e.g., the logic 16, determining if one or more of the radio transmitters and the radio receivers are in a tracked area, enabling the active tracking mode if one or more of the radio transmitters and the radio receivers are determined to be in the tracked area, periodically transmitting identification information from at least one of the radio transmitters if the active tracking mode is enabled, etc.).

Figure 2:
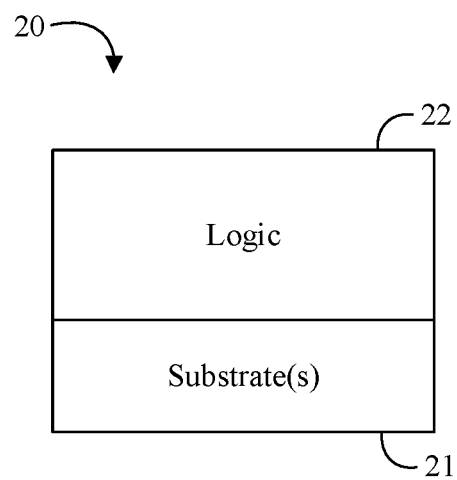
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine if one or more co-located radio transmitters and radio receivers are in a tracked area, enable an active tracking mode if one or more of the co-located radio transmitters and radio receivers are determined to be in the tracked area, and periodically transmit identification information from at least one of the radio transmitters if the active tracking mode is enabled. In some embodiments, the logic 22 may be further configured to disable the active tracking mode if one or more of the co-located radio transmitters and radio receivers are determined to not be in the tracked area, place a processor, memory, and the co-located radio transmitters and radio receivers in a sleep mode when the active tracking mode is disabled, and periodically wake from the sleep mode to determine if one or more of the co-located radio transmitters and radio receivers are in the tracked area. For example, the logic 22 may also be configured to wake from the sleep mode in response to a read event to determine if one or more of the co-located radio transmitters and radio receivers are in the tracked area. In some embodiments, the logic 22 may be further configured to periodically store time information and external transmitter information received by one or more of the radio receivers if the active tracking mode is enabled. In any of the embodiments herein, the logic 22 may also be configured to cause a name and image of a user associated with the identification information to be displayed. For example, the one or more co-located radio transmitters and radio receivers may include one or more of a WIFI radio, a GPS receiver, a cellular radio, and a RFID tag. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 25 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
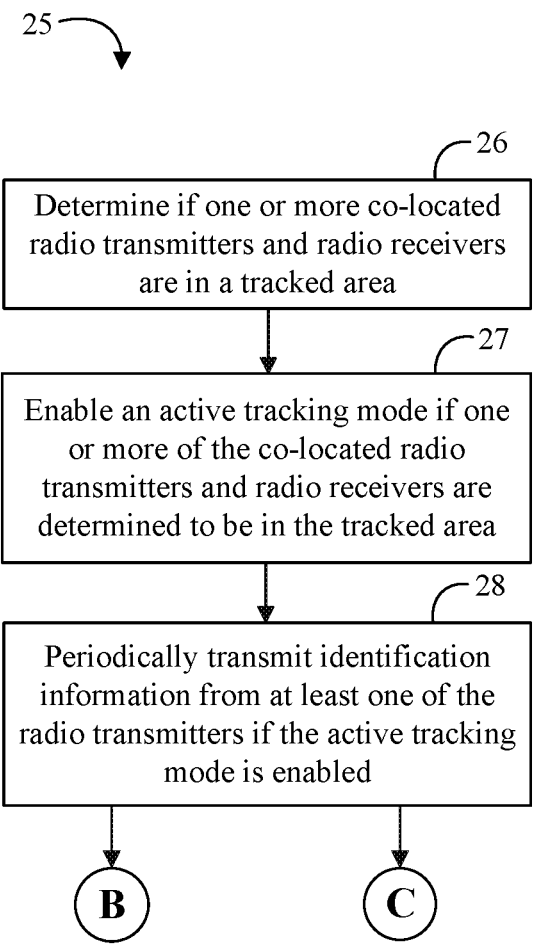
FIGS. 3A to 3C are flowcharts of an example of a method of tracking a location according to an embodiment.
Figure 3B:
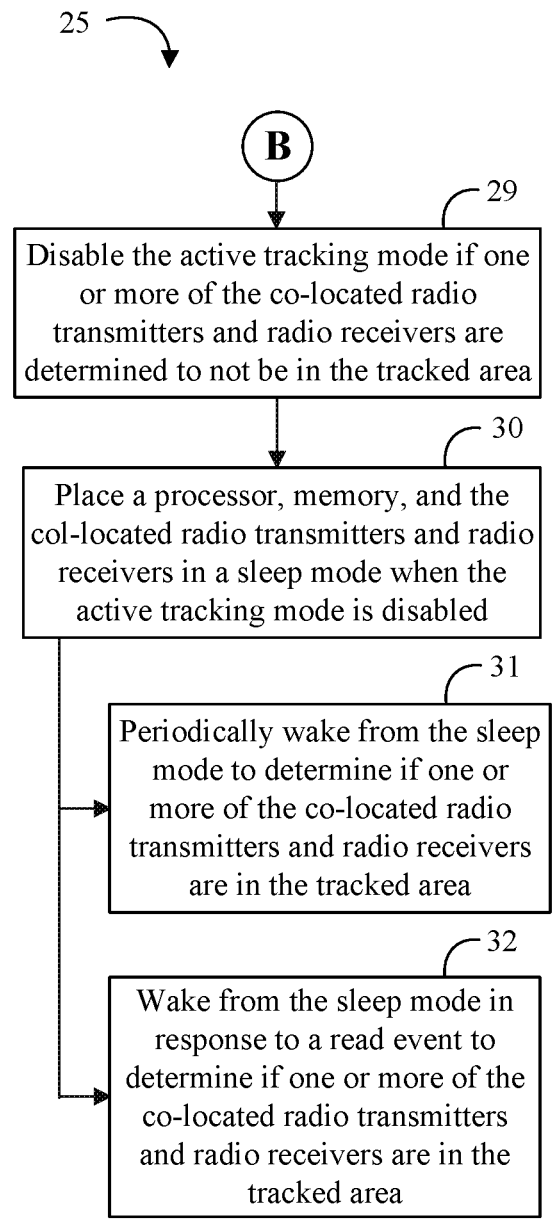
Figure 3C:
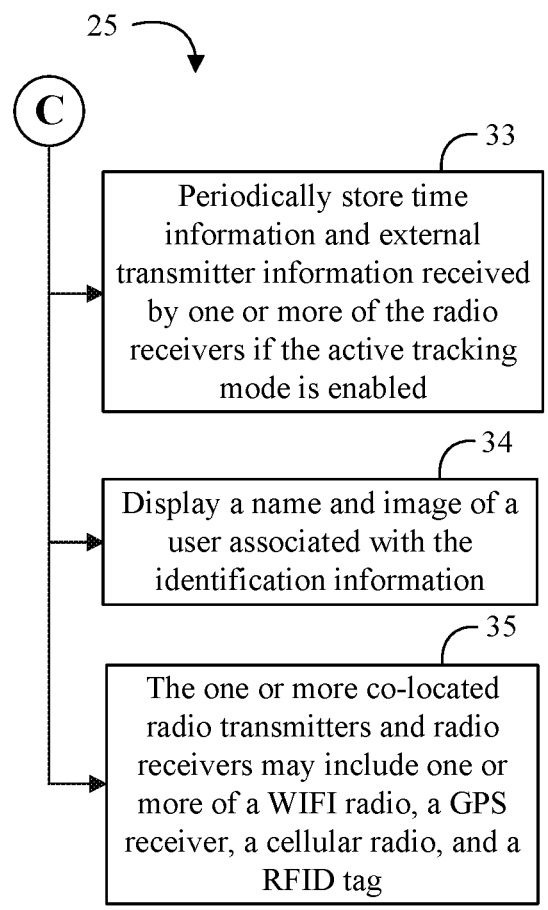

Turning now to FIGS. 3A to 3C, an embodiment of a method 25 of tracking a location may include determining if one or more co-located radio transmitters and radio receivers are in a tracked area at block 26, enabling an active tracking mode if one or more of the co-located radio transmitters and radio receivers are determined to be in the tracked area at block 27, and periodically transmitting identification information from at least one of the radio transmitters if the active tracking mode is enabled at block 28. Some embodiments of the method 25 may further include disabling the active tracking mode if one or more of the co-located radio transmitters and radio receivers are determined to not be in the tracked area at block 29, placing a processor, memory, and the co-located radio transmitters and radio receivers in a sleep mode when the active tracking mode is disabled at block 30, and periodically waking from the sleep mode to determine if one or more of the co-located radio transmitters and radio receivers are in the tracked area at block 31. For example, the method 25 may also include waking from the sleep mode in response to a read event to determine if one or more of the co-located radio transmitters and radio receivers are in the tracked area at block 32. Some embodiments of the method 25 may also include periodically storing time information and external transmitter information received by one or more of the radio receivers if the active tracking mode is enabled at block 33, and/or displaying a name and image of a user associated with the identification information at block 34. For example, the one or more co-located radio transmitters and radio receivers may include one or more of a WIFI radio, a GPS receiver, a cellular radio, and a RFID tag at block 35.

Embodiments of the method 25 may be implemented in a system, apparatus, computer, device, etc., for example, such as those described herein. More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 25 may be implemented on a computer readable medium as described in connection with Examples 20 to 25 below. Embodiments or portions of the method 25 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide an electronic identification (ID) badge. Typically, conventional ID badges used by corporations and governments are non-intelligent. The ID badge may grant access to every building of a company globally, may manage access to the highest secured areas where critical IP may be exposed, and may limit access into hazardous areas where it is essential that only those with proper training are allowed. A conventional ID may be encoded with a unique identifier (e.g., credential #) and a key that allows the data to be transmitted to devices like security access control badge readers "badge readers". When presented to a badge reader with a complimentary key, the ID badge may pass the badge credentials to an access reader to unlock a door. The badge may include various security technology to harden access to the credential data, and some badges may include some memory, but otherwise a conventional ID badge is unintelligent with limited functionality.

Some embodiments may advantageously include multiple technologies in a small form factor (e.g., dimensions of about 2¼" wide by 3½" tall and about ¼ inch thick). The technologies may include two or more of GSM, GPS, WIFI, NFC, BLE, HID Tag, and low power display technology (e.g., LCD, electronic ink (e-ink), etc.). Some embodiments may provide badge interoperability with legacy, current and next generation badge readers (e.g., BLUETOOTH readers, NFC readers, etc.), enable location tracking (e.g., using WIFI or GPS), and may also display the person's name and employment type (e.g., similar to a printed PVC badge).

Some embodiments may be implemented with smartphone or tablet technology, with a suitably configured application providing one or more of the features described herein. Many devices may be managed from a mobile device (e.g., smart phone, tablet). Smartphones may be setup to provide access through badge readers, to unlock a PC, turn lights on and off, control heating and cooling, and even as TV remote. In some environments, everyone who needs access and/or needs to be tracked may already carry a smart phone that they generally keep on their person (or nearby). For example, some applications running on mobile phones may be able to determine the location of the phones using GSM information outside and wireless access point pings indoors. Accordingly, an electronic ID badge functionality may be implemented with a smartphone including suitable hardware (e.g., various radio transmitters/receivers, legacy card reader hardware, etc.) and applications configured to provide various aspects or features of the embodiments described herein.

In some environments, however, it may be too expensive and/or impractical to provide a smartphone to all of the users who may need to wear/use an ID/access badge. In order to make the use of location tracking a condition of employment, for example, governments and/or corporations may need to provide suitable devices to their employees and contingent workers, which may be prohibitively expensive for smartphones. A smartphone may also need to be out of its case/holster, unlocked, and/or have the applications running for the smartphone to work with the multiple technologies described above, which may be impractical for some environments. There may also be a large cost for a company to upgrade/replace all of its legacy badge readers with smartphone compatible readers.

Figure 4:
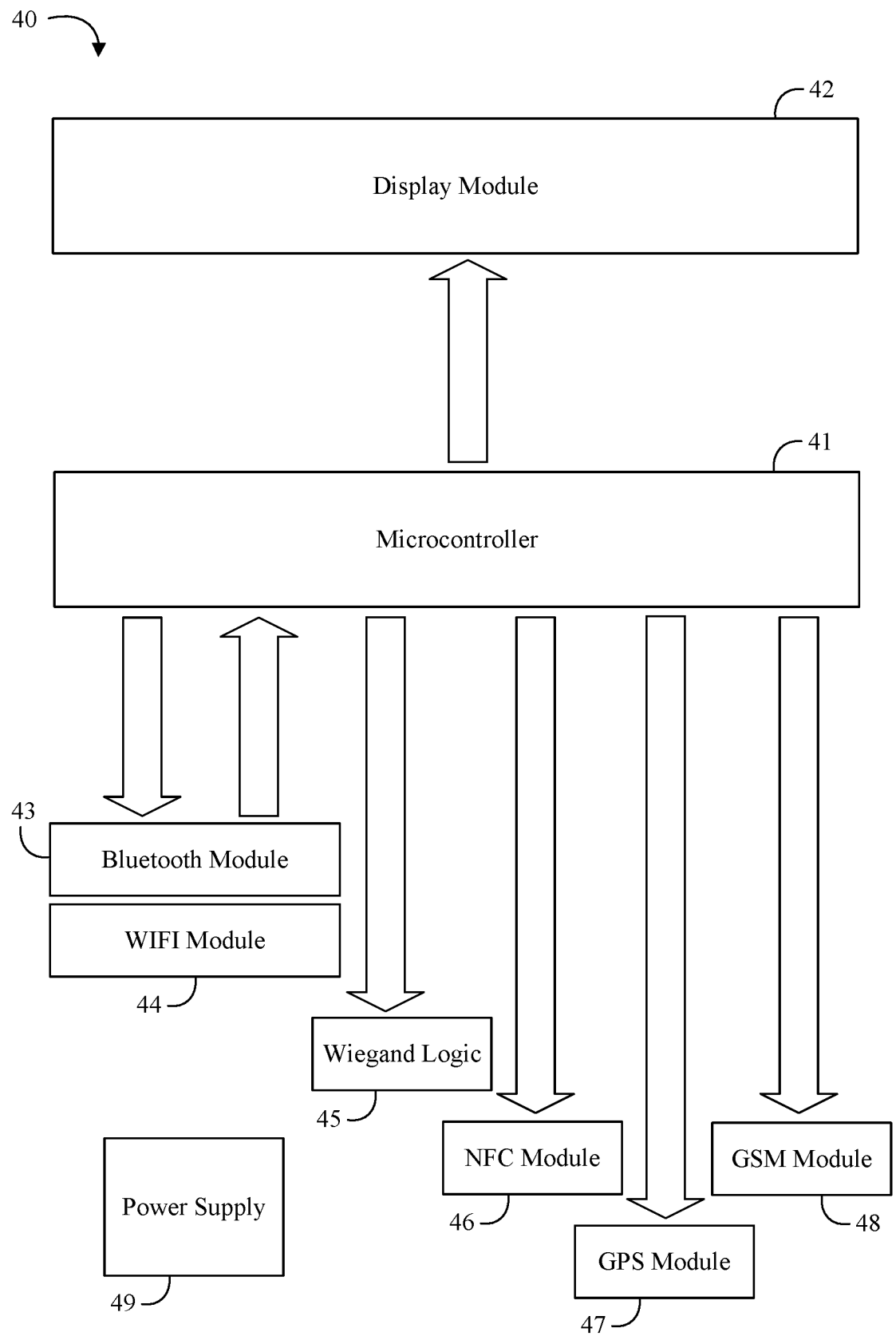
FIG. 4 is a block diagram of another example of an electronic identification badge according to an embodiment.

Turning now to FIG. 4, an embodiment of an electronic ID badge 40 may include a microcontroller 41 (e.g., 16-bit or 32-bit) communicatively coupled to a display module 42, a BLUETOOTH module 43, a WIFI module 44, WIEGAND logic 45, a NFC module 46, a GPS module 47, and a GSM module 48. The badge 40 may further include a power supply 49 (e.g., and other suitable components such as memory, connectors, etc.). Advantageously, embodiments of the badge 40 may be inexpensive as compared to the cost of a smart phone. Some embodiments of the badge 40 may actively be interacting with and transmitting location data via GPS, WIFI, and GSM. The badge 40 may also be compatible with legacy, current and next generation badge readers and may display a photo, name, company affiliation (e.g., employee or contract worker), etc., similar to a printed conventional PVC badges used by corporations and governments.

Some embodiments may advantageously leverage the multiple technologies included in the electronic identification (ID) badge to enhance location tracking of the badge (e.g., and the associated user, asset, etc.). A conventional ID badge may provide a general idea of where the badge is located based on reading the badge at fixed access locations (e.g., through the use of badge readers used to access in a gated environment, in a particular building, in a particular room, etc.). In an emergency situation, such information may be useful (e.g., how many people are in a building and/or who is in the building). Some embodiments may provide more detailed location information such as a more precise location of a person in a tracked area to help emergency responders locate that person. Some embodiments may also be useful for healthcare facilities to track more precise locations of patients (e.g., patients with dementia or memory care issues). Some embodiments may also be useful for inventory tracking and/or control. Some embodiments may also be useful for subsequent investigations into theft and/or security incidents in a tracked area by keeping a log of tracked locations (e.g., or location signatures which may be utilized to recreate the locations of the badge).

Some embodiments of the badge 40 may incorporate location tracking technology in a much less expensive device which omits much of the functionality of a smartphone while improving on the technology included for location tracking. For example, some embodiments may control the ping rate of the badge 40 to make the location tracking more precise (e.g., to avoid long time gaps where the location may not be accounted for). In some environments, everyone may be required to wear a badge (e.g., as a condition of employment, for safety, etc.). Some embodiments may advantageously replace a simple picture/access PVC badge with a low cost electronic badge that may provide increased functionality at a significantly reduced price point (e.g., as compared to a smartphone).

Some embodiments of an electronic ID badge may be used to track individuals in critical areas and to archive their location signatures. Emergency responders may leverage the same data to help sweep buildings during an emergency and to track the emergency responders themselves. Some embodiments may be particularly useful to companies, governments, and/or organizations who manage large campuses and/or large people populations. Some embodiments may be similar in size as a conventional CR80 PVC badge and may weigh approximately 5 ounces, but it may also adhere to the CR100 standard for PVC badges. Some embodiments may use BLUETOOTH LOW ENERGY (BLE), Near Field Communications (NFC) or Smart Card Protocol to transmit card data to card readers. The electronic ID badge may leverage WIFI technology to track indoor locations through ping connections to wireless access points. Through GPS and GSM technology, the badge may provide the capability to determine outdoor locations. In some embodiments, an LCD display may display the person's name, image, company name, etc., similar to the look of a conventional ID badge.

Some embodiments of an electronic may include an embedded OS with no user interface or interaction. Some embodiments may alternatively support a user interface and/or user applications. For example, users of some embodiments of an electronic ID badge may experience ease of access through secured entry points, services in a company cafeteria/store, medical offices, printing, access to secured parking areas, automated PC log in, etc., while the company may be able to leverage a low cost device for access to all of these services (e.g., relative to a fully configured smartphone).

Some embodiments may provide a thin, highly hardened screen type device the size of a conventional CR80 PVC badge and may weigh approximately 5 ounces, but it may also adhere to the CR100 standard fir PVC badges. The electronic ID may display a badge photograph and name as its default screen saver (e.g., typical logos and data attributes employed by governments and companies). By integrating numerous technologies (e.g., GSM, WIFI, NFC, BLUETOOTH, WIEGAND, video, etc.) in the housing, however, further opportunities open up for a low cost, durable electronic ID badge. Some embodiments of the electronic ID badge may be easily and quickly provisioned in a lobby and, be issued on a temporary basis in the event a worker forgets or loses their permanently issued electronic ID. By provisioning the electronic ID it will assume all functionality of the permanently issued electronic id, albeit on a temporary basis with an expiration time, after which it will cease to function.

In some embodiments, access control may be provided through the use of BLUETOOTH and NFC to unlock next generation card reader doors. Access control may also be provided through the use of smart card technology to provide backward compatibility with legacy card reader technology. Some embodiments may utilize WIFI and/or GSM technology to allow the tracking of an individual within hazardous or high security areas.

Based on card reader access, a security investigator can conventionally only determine who was in an area. Entering through the badge reader a transaction is archived but that person is than potentially free to roam anywhere within the controlled space, which could be hundreds of thousands square feet of space. Through the use of some embodiments of electronic ID technology, where permitted by local law, investigators may further determine where an individual was in the secured area through review of Wi-Fi ping data. This may quickly reduce the suspect list and narrow the investigation to only those within the area of interest. In a disaster, emergency responders may determine how many people are still in a building, where they are, or what their last known location was. Construction services, procurement, and other administrative services may further leverage WIFI ping location data to determine if invoicing matches worker time spent working on projects in critical areas, where otherwise reconciling thousands of man hours on large projects may be difficult or impossible.

Some embodiments of an electronic ID badge may be 100% recyclable and as a worker transitions out, their electronic ID badge may be re-provisioned and issued to another worker. In the event a worker forgets their electronic ID badge, a temporary, one-day electronic ID may be issued and easily provisioned for a one-day use.

In some embodiments, low current draw may be important and microcontrollers (e.g., 16 or 32 bit) with very low power consumption may be utilized to provide basic functionality as a carrier of keys, credentials and certificates, and location tracking. In some embodiments, charging the electronic ID on a regular basis (e.g., every few days) may be acceptable and the microcontroller may be replaced with a more powerful component or a microprocessor (e.g., such as the INTEL ATOM). In some embodiments, the electronic ID may run LINUX or ANDROID and provide compatibility with applications such as email, SKYPE, etc. to enhance communication capabilities of the electronic ID. Any suitable memory technology may be utilized with embodiments of the electronic ID including non-volatile memory technology such as phase change memory (PCM) including INTEL 3DXPOINT memory.

Power Examples

In some embodiments, an electronic ID badge may utilize little or no external power (e.g., for charging) and may leverage one or more artificial power sources (e.g., solar, kinetic, etc.). Some embodiments may run independent of traditional power and not require charging. Some embodiments may provide utilize low power components and power management technology to provide long battery life (e.g., about 200 hours) and may only need to be charged once a week. More fully featured embodiments may provide at least 16-18 hours battery life to get through a typical work day without charging. Some embodiments may support wireless charging (e.g., a charging tray that people could just lay the electronic ID on at night to charge for the next day). Some embodiments may additionally, or alternatively, include conventional charging technology (e.g., a micro-USB port and a USB wall charger) to charge the unit as needed.

Some embodiments may include energy harvesting technology to provide all of the devices charging needs or to supplement external charging sources. Some embodiments may harvest power using human movement (e.g., using kinetic energy or piezoelectricity) to help power the electronic ID. For example, walking may produce somewhere in the region of 100-200 microwatts. Intentionally shaking the electronic ID, may create more than about 3,000 microwatts. Such human movement may not produce all the power for the electronic ID badge, but may extend the battery life. Some embodiments may additionally, or alternatively, utilize a combination of solar and artificial solar, wireless power and WIFI power to provide power for the electronic ID or to supplement external charging sources. Some embodiments may advantageously reduce the power consumed by the electronic ID with power management technology to power cycle the ID or components of the ID based on a tracked area (e.g., a geo fence) and a listening circuit or wake command may occasionally get a location status and turn on the device at the appropriate time.

Processor/Microcontroller Examples

Any suitable processor/microcontroller technology may be utilized with the electronic ID, depending on the desired functionality and/or power usage. A suitable 16-bit microcontroller may include the PIC24 family from MICROCHIP. A suitable 32-bit microcontroller may include the PIC32 family from MICROCHIP. As noted above, a suitable microprocessor may include the INTEL ATOM family. Some of these Nano Watt devices may have an idle current of 13 nA with timers and peripherals running 2.3 uA.

WIFI Examples

Some indoor areas may have high volume of accesses to wireless access points (WAPs). A user may come within range of a WAP numerous times in a day. Some embodiments of an electronic ID badge may advantageously tune the WIFI power down so the range picks up fewer WAPs (e.g., only the nearest WAP). In some embodiments, the electronic ID badge may try to connect to one or more WAPs in range (e.g., the nearest WAP based on signal strength) and may push the credential data from the badge without running an application on the badge. A central server may collect the information from the badge and store it together with time information to track the location of the badge. Alternatively, or additionally, some embodiments may reduce power consumption of the electronic ID badge by consuming WIFI MAC addresses from the WAP(s) and store them in the badge together with a time stamp. The electronic ID badge may only connect to WIFI at some pre-determined interval to transfer the information stored on the badge. In some embodiments, the badge may identify duplicate hits from WAPs and ignore the duplicate hits to reduce the memory consumption on the badge.

Any suitable WIFI technology may be utilized for embodiments of an electronic ID badge. For example, the MRF24WN0MA module from MICROCHIP has built-in antenna and FCC approvals, and provides features to turn the WIFI on or off as needed (e.g., based on the module being located in a tracked area/geo fence) and also features to tune the WIFI power lower so the badge may try to connect to fewer WAPs.

GPS Examples

Some embodiments may include a GPS module to track the badge location in outdoor areas (e.g., and/or to supplement the badge location tracking in indoors areas). For some companies/organizations, the outdoor areas to track may be very large but users may quickly transit from one building to another fairly quickly. Some embodiments may configure the electronic ID badge to get a GPS position every 30 seconds, especially if the person is in a vehicle. Some embodiments may turn the GPS on and off as needed (e.g., based on whether the badge is in a tracked area/geo fence). In some embodiments, the badge may try to connect through GSM and the badge may push the credential data from the badge to a central server without running an application on the badge. The central server may collect the information from the badge and store it together with time information to track the location of the badge. Alternatively, or additionally, some embodiments may reduce power consumption of the electronic ID badge by consuming GPS addresses and store them in the badge together with a time stamp. The electronic ID badge may only connect to GSM/WIFI at some pre-determined interval to transfer the information stored on the badge. In some embodiments, the badge may identify duplicate hits from the GPS receiver and ignore the duplicate hits to reduce the memory consumption on the badge. Any suitable GPS technology may be utilized by some embodiments. For example, the ANTENOVA GPS RADIONOVA M10478 RF antenna module may provide an ultra-compact single package solution to combine RF and antenna on the same module.

Other Low Power Component Examples

An example Serial Peripheral Interface (SPI) interface may operate on 3.3V power and consume about 64 mA in a receive (RX) mode, about 246 mA in a transmit (TX) mode, and about 10 uA in a hibernate mode. An example BLUETOOTH module may include an UART interface and may operate on 3.3V power. The module may consume about 16 mA in active TX/RX, 1.5 uA idle, less than 5 uA in deep sleep, and less than 900 nA when dormant.

Some embodiments may include an NFC tag. NFC tags do not require power. Instead, they capture the RF signal from the reader to power the chip in the NFC tag. Either the RF signal from the reader or the NFC chip power on may trigger a wake event in some embodiments of an electronic ID badge (e.g., which may cause the electronic ID badge to determine its current location and whether the current location is in a tracked area/geo fence). Some embodiments may additionally or alternatively include Smart Card technology. Similar to the NFC tag, the Smart Card chip does not require power as it captures the power of the WIEGAND reader (e.g., an HID iCLASS reader). Some embodiments may utilize an HID iCLASS and PHILLIPS HI-TAG chip instead of including BLE technology. When included, BLE may provide more functionality (e.g., and compatibility with other BLUETOOTH technology).

Such card access transactions may be relatively low occurrence for most users (e.g., 50 may correspond a heavy user). Some embodiments of the electronic ID badge may not record such transactions because they may automatically be collected and stored by the card reader systems. Alternatively, or additionally, some embodiments of the electronic ID badge may store the card access information together with time information for later transfer to a central server.

Any suitable antenna technology may be utilized by some embodiments. For example, a suitable low cost single package SMD RF antenna module may include the CSR SIRF-STARIV GSD4E 9333 GPS IC, which may provide an ultra-small, low 1.8 mm height for thin devices. An adaptive micro power controller may only consume about 50-500 uA and may maintain hot start capability. The module may provide external matching to ensure easy tuning for each platform, and anti-jamming technology may rack up to 8 CW jammers.

Any suitable display technology may be utilized for embodiments which include a display. The power consumption (e.g., and processor time) may depend greatly on the size and the required resolution. For example, the XIAMEN OCULAR GDM12864B may be suitable for some embodiments. Some embodiments may display a static image and otherwise not power the LCD screen. The display may be static unless the badge gets re-issued and at that point the badge may be re-imaged. Electronic ink displays may also provide suitable static display technology for some embodiments.

Figure 5:
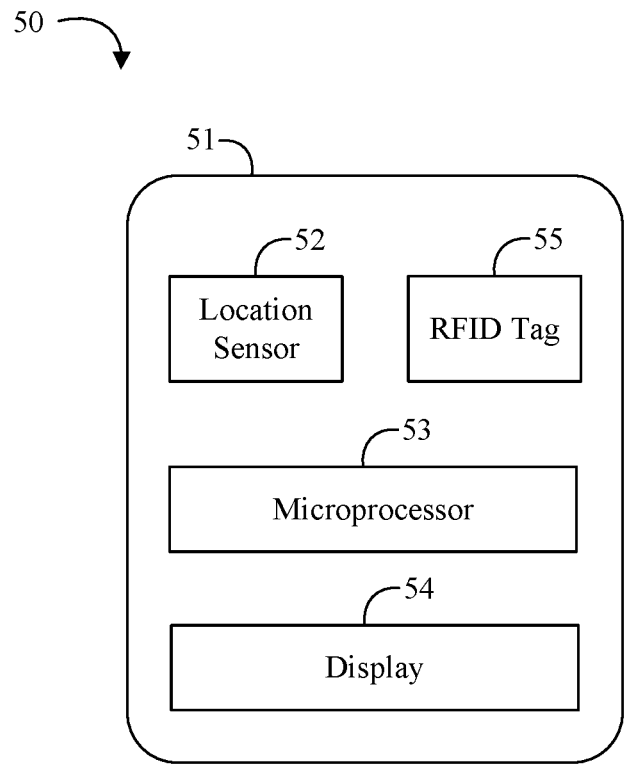
FIG. 5 is a block diagram of another example of an identification badge according to an embodiment.

Turning now to FIG. 5, an embodiment of an identification badge 50 may include a housing 51 having a card form factor, a location sensor 52 positioned within the housing 51, and a microprocessor 53 positioned within the housing 51 and coupled to the location sensor 52. The microprocessor 53 may be configured to determine a location of an individual associated with the identification badge 50 based on one or more signals from the location sensor 52. In some embodiments, the identification badge 50 may further include a display 54 coupled to the microprocessor 53, the display 54 to visually present a name and image of the individual associated with the identification badge 50. For example, the location sensor 52 may include one or more of a WIFI radio, a GPS receiver and/or a cellular radio. Some embodiments of the identification badge 50 may also include a RFID tag 55 positioned within the housing 51.

Figure 6:
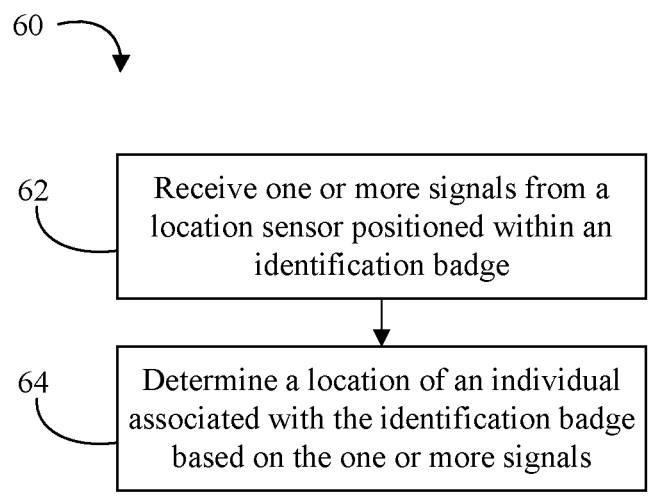
FIG. 6 is a flowchart of an example of a method of operating an identification badge according to an embodiment.

FIG. 6 shows a method 60 of operating an identification badge. The method 60 may generally be implemented in a microprocessor of an electronic ID badge such as, for example, the badge 10 (FIG. 1), the badge 40 (FIG. 4), and/or the badge 50 (FIG. 5), already discussed. More particularly, the method 60 may be implemented in one or more modules as a set of logic instructions stored in a machine- or computer-readable storage medium such as random access memory (RAM), read only memory (ROM), programmable ROM (PROM), flash memory, etc., as configurable logic such as, for example, programmable logic arrays (PLAs), field programmable gate arrays (FPGAs), complex programmable logic devices (CPLDs), as fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 receives one or more signals from a location sensor positioned within an identification badge. The location sensor may include, for example, a WIFI radio, a GPS receiver, a cellular radio, etc., or any combination thereof. A location of an individual associated with the identification badge may be determined at block 64 based on the one or more signals. In one example, block 64 includes using triangulation and/or signal strength analysis with respect to one or more wireless access points in the vicinity of the identification badge.

Docking Station Examples

Figure 7:
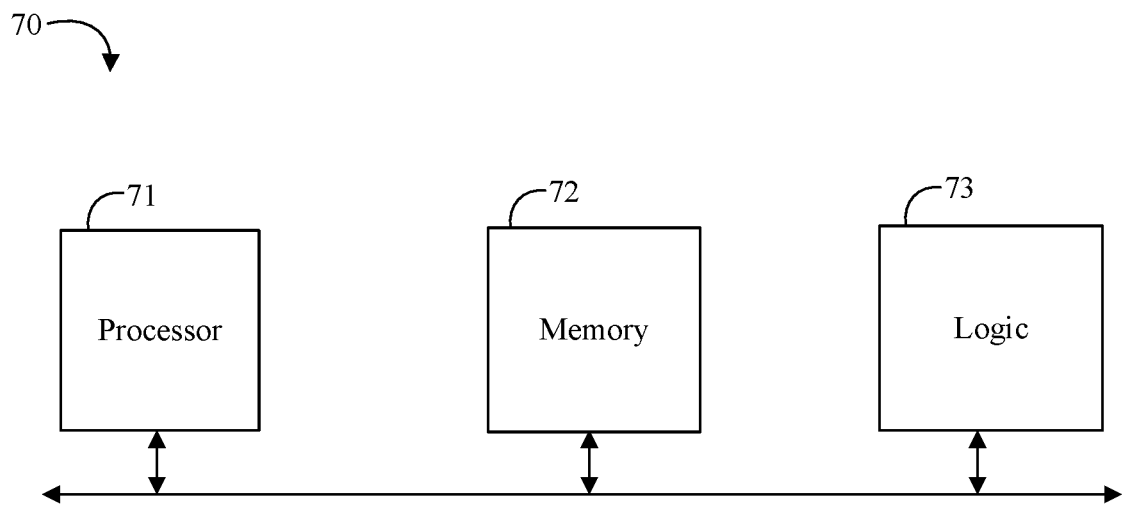
FIG. 7 is a block diagram of an example of an electronic processing system according to an embodiment.

Turning now to FIG. 7, an embodiment of an electronic processing system 70 may include a processor 71, memory 72 communicatively coupled to the processor 71, and logic 73 communicatively coupled to the processor 71 to authenticate an electronic identification badge, establish a secure communication path with the electronic identification badge, and provision the electronic identification badge over the secure communication path. For example, the logic 73 may be configured to provision one or more of identification information, an application, a security key, and a credential for the electronic identification badge over the secure communication path. In some embodiments, the logic 73 may be further configured to set a duration period, and invalidate one or more of the identification information, the application, the security key, and the credential for the electronic identification badge upon expiration of the duration period. For example, the logic 73 may be housed in a docking station. In some embodiments, the logic 73 may be located in, or co-located with, various components, including the processor 71 (e.g., on a same die).

Embodiments of each of the above processor 71, memory 72, logic 73, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 72, persistent storage media, or other system memory may store a set of instructions which when executed by the processor 71 cause the system 70 to implement one or more components, features, or aspects of the system 70 (e.g., the logic 73, authenticating the electronic identification badge, establishing the secure communication path with the electronic identification badge, provisioning the electronic identification badge over the secure communication path, etc.).

Figure 8:
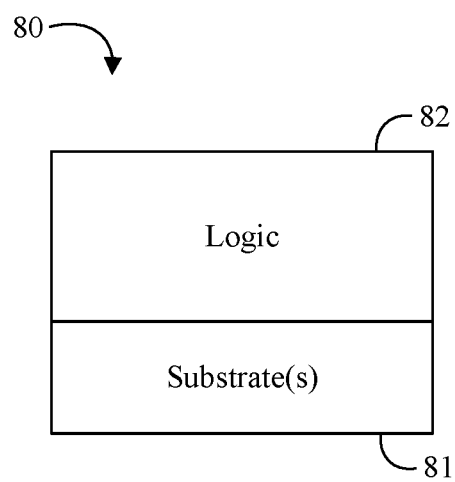
FIG. 8 is a block diagram of another example of a semiconductor package apparatus according to an embodiment.

Turning now to FIG. 8, an embodiment of a semiconductor package apparatus 80 may include one or more substrates 81, and logic 82 coupled to the one or more substrates 81, wherein the logic 82 is at least partly implemented in one or more of configurable logic and fixed-functionality hardware logic. The logic 82 coupled to the one or more substrates 81 may be configured to authenticate an electronic identification badge, establish a secure communication path with the electronic identification badge, and provision the electronic identification badge over the secure communication path. For example, the logic 82 may be configured to provision one or more of identification information, an application, a security key, and a credential for the electronic identification badge over the secure communication path. In some embodiments, the logic 82 may be further configured to set a duration period, and invalidate one or more of the identification information, the application, the security key, and the credential for the electronic identification badge upon expiration of the duration period. For example, the logic 82 may be housed in a docking station. In some embodiments, the logic 82 coupled to the one or more substrates 81 may include transistor channel regions that are positioned within the one or more substrates 81.

Embodiments of logic 82, and other components of the apparatus 80, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 80 may implement one or more aspects of the method 130 (FIG. 9), or any of the embodiments discussed herein. In some embodiments, the illustrated apparatus 80 may include the one or more substrates 81 (e.g., silicon, sapphire, gallium arsenide) and the logic 82 (e.g., transistor array and other integrated circuit/IC components) coupled to the substrate(s) 81. The logic 82 may be implemented at least partly in configurable logic or fixed-functionality logic hardware. In one example, the logic 82 may include transistor channel regions that are positioned (e.g., embedded) within the substrate(s) 81. Thus, the interface between the logic 82 and the substrate(s) 81 may not be an abrupt junction. The logic 82 may also be considered to include an epitaxial layer that is grown on an initial wafer of the substrate(s) 81.

Figure 9:
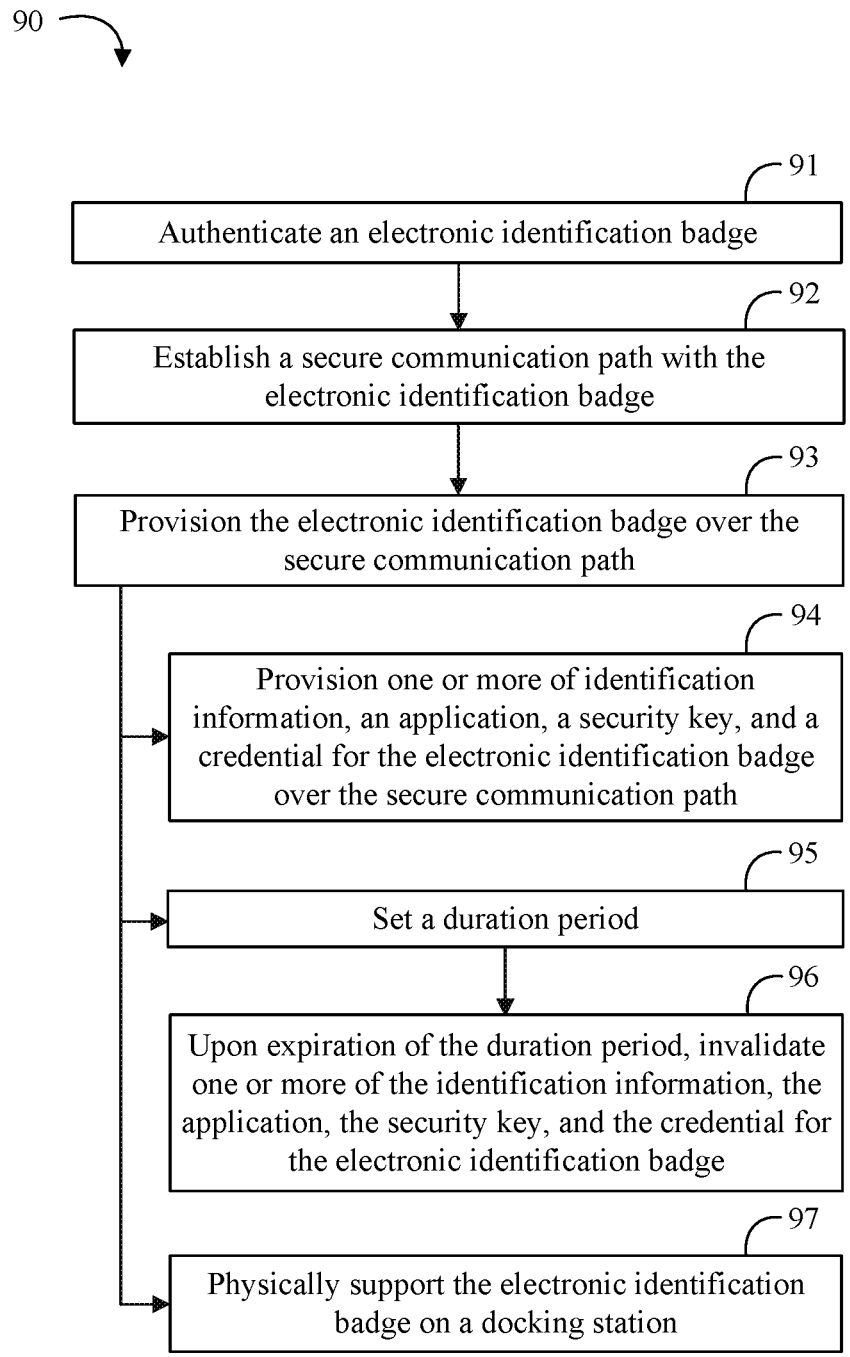
FIG. 9 is a flowchart of an example of a method of provisioning an electronic identification badge according to an embodiment.

Turning now to FIG. 9, an embodiment of a method 90 of provisioning an electronic identification badge may include authenticating an electronic identification badge at block 91, establishing a secure communication path with the electronic identification badge at block 92, and provisioning the electronic identification badge over the secure communication path at block 93. For example, the method 90 may include provisioning one or more of identification information, an application, a security key, and a credential for the electronic identification badge over the secure communication path at block 94. Some embodiments of the method 90 may further include setting a duration period at block 95, and invalidating one or more of the identification information, the application, the security key, and the credential for the electronic identification badge upon expiration of the duration period at block 96. For example, the method 90 may also include physically supporting the electronic identification badge on a docking station at block 97.

Embodiments of the method 90 may be implemented in a system, apparatus, computer, device, etc., for example, such as those described herein. More particularly, hardware implementations of the method 90 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 90 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 90 may be implemented on a computer readable medium as described in connection with Examples 45 to 47 below. Embodiments or portions of the method 90 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

As described herein, an electronic ID may provide a device to replace a PVC ID badge, in some embodiments including electronics to enhance badge technology and provide location tracking. Some embodiments may support legacy compatibility with traditional badge readers, add the ability to communicate with next generation Bluetooth and NFC badge readers, and extend interoperability with location services, etc. The advantages of the electronic ID may go beyond the technology. For example, some embodiments of the low cost device may provide the ability to quickly and easily provision applications, keys and credentials. Some embodiments may provide the opportunity to issue a temporary Electronic ID for a short duration and to repurpose the device and re-issue to another individual, changing hands from exiting employees to new hires. Some embodiments of a docking station may advantageously cooperate with the electronic ID to support such quick and easy provisioning.

In order to utilize some embodiments of an electronic ID, the electronic ID may first be provisioned with applications, keys and credentials associated to the owner of the ID. For some embodiments, such provisioning may utilize an interface to a provisioning authority (e.g., a central server, PC, laptop, tablet, etc., running a suitably configured provisioning application). To connect the electronic ID to the provisioning authority, some embodiments may advantageously provide a dedicated docking station. For example, the docking station may be hardwire connected via a USB connection or other physical connection. Alternatively, or additionally, some communications may be provided wirelessly (e.g., through BLUETOOTH, NFC, WIFI, GSM, etc.).

In accordance with some embodiments, after the electronic ID is connected to the docking station, an authentication handshake may occur. For example, such authentication may include a transmission of a MAC address or EIN from the electronic ID and an authentication from the user that it is the correct device. Following the authentication handshake, the user may make a secured and authenticated connection (e.g., Active Directory, etc.) to the provisioning authority.

After establishing the secured and authenticated connection, the user may be stepped through the process to download applications, keys, and certificates to the electronic ID (e.g., some or all of which may proceed automatically in some embodiments). In some embodiments, the entire provisioning process may be accomplished in less than a minute. If appropriate, the download/provisioning may be temporary and an expiration duration may be assigned to the electronic ID (e.g., the expiration may be assigned in both the electronic ID and the access control system). The download/provisioning may instead be persistent (e.g., with no assigned duration) where that electronic ID is assigned to and used by an employee until they are no longer employed.

Figure 10C:
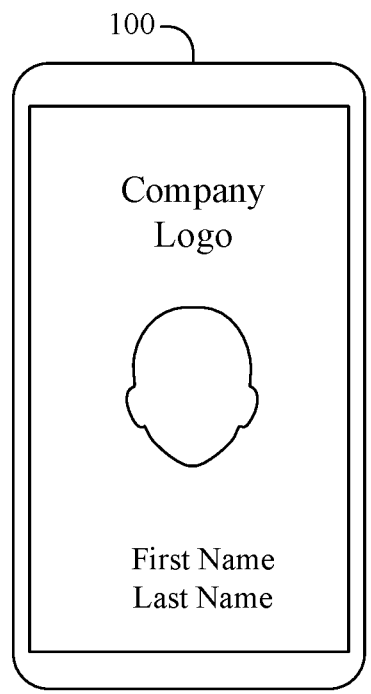

Turning now to FIGS. 10A to 10C, an embodiment of an electronic ID badge 100 may have a card form factor (e.g., similar to a smartphone) with a relatively thin profile (e.g., see FIGS. 10B and 10C). The front of the badge 100 may display identification information such as company name, badge holder's photo, badge holder's name, etc. The electronic ID badge 100 may include RFID tag technology and may include one or more antennas within the housing of the badge 100.

Figure 11:
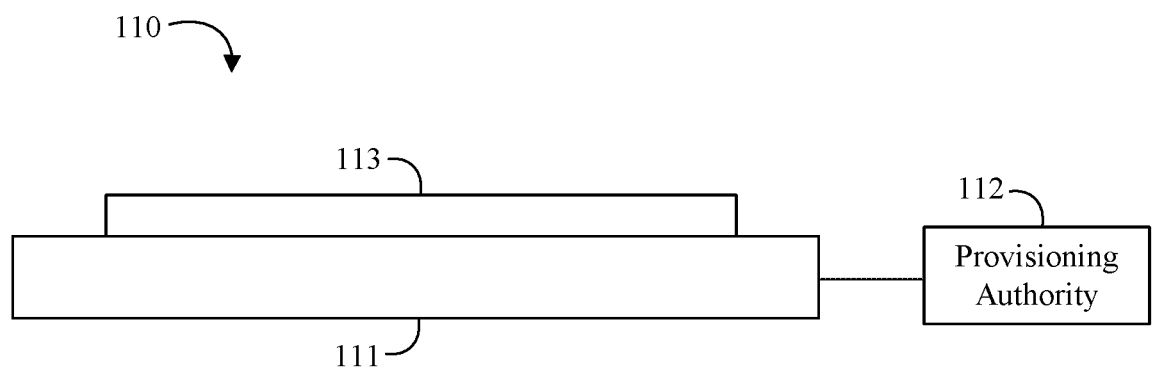
FIG. 11 is a block diagram of an example of a provisioning system according to an embodiment.

Turning now to FIG. 11, a provisioning system 110 may include a wireless docking station 111 communicatively coupled to a provisioning authority 112. An electronic ID 113 may be placed on the wireless docking station 111 to provision the electronic ID 113. For example, the wireless docking station 111 may include wireless charging technology. The wireless docking station may also include wireless and/or wired communication technology. For example, the communication with the electronic ID may be wireless, while the communication with the provisioning authority 112 may be wired (e.g., or both may be wireless).

The wireless docking station 111 may include technology to authenticate the electronic ID 113, establish a secure communication path with the electronic ID 113, and provision the electronic ID 113 over the secure communication path. For example, the wireless docking station 111 may include technology to provision one or more of identification information, an application, a security key, and a credential for the electronic ID 113 over the secure communication path. In some embodiments, the wireless docking station 111 may include technology to set a duration period, and invalidate one or more of the identification information, the application, the security key, and the credential for the electronic identification badge upon expiration of the duration period. For example, the wireless docking station 111 may exchange information related to the electronic ID 113 with the provisioning authority 112 and receive provisioning information from the provisioning authority 112 for the electronic ID 113. The wireless docking station 111 may then provision the electronic ID 113 based on the provisioning information received from the provisioning authority 112.

Figure 12:
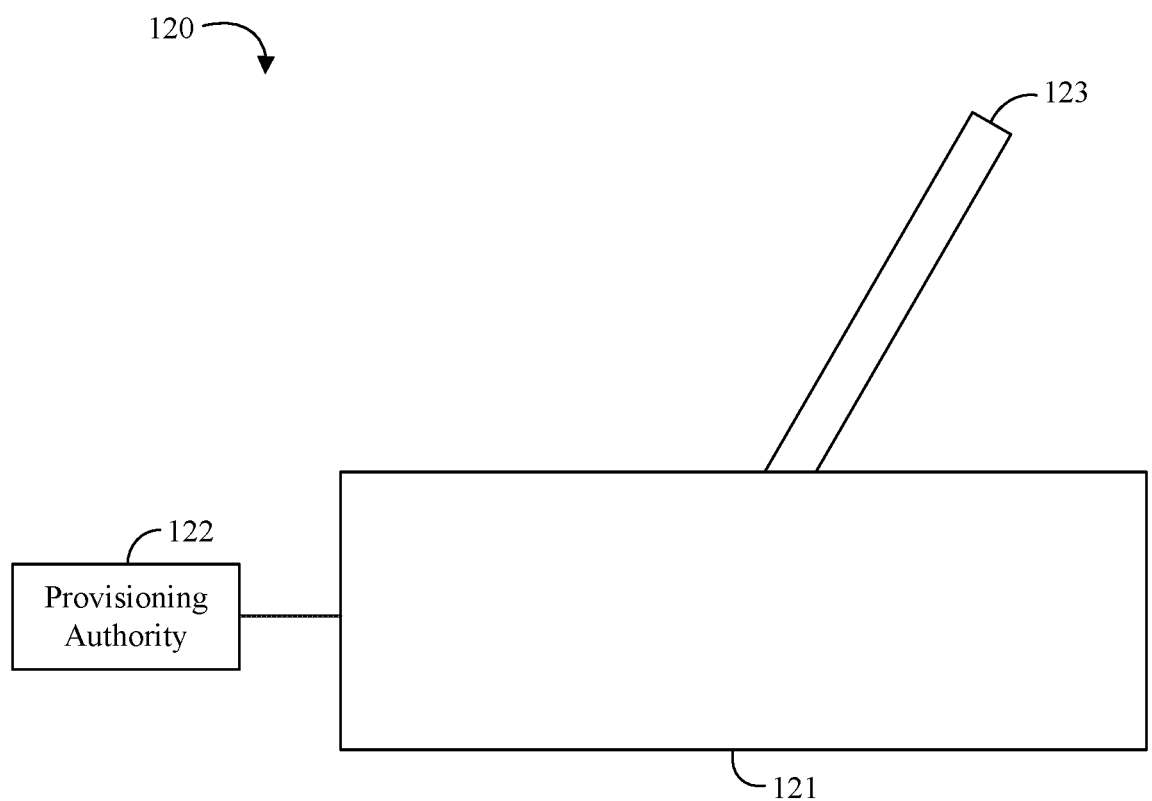
FIG. 12 is a block diagram of another example of a provisioning system according to an embodiment.

Turning now to FIG. 12, a provisioning system 120 may include a wired docking station 121 communicatively coupled to a provisioning authority 122. An electronic ID 123 may be placed on the wired docking station 121 to provision the electronic ID 123. For example, the wired docking station 111 may include wired charging technology. The wired docking station may also include wired and/or wireless communication technology. For example, the communication with the electronic ID may be wired, while the communication with the provisioning authority 122 may be wireless (e.g., or both may be wired).

The wired docking station 121 may include technology to authenticate the electronic ID 123, establish a secure communication path with the electronic ID 123, and provision the electronic ID 123 over the secure communication path. For example, the wired docking station 121 may include technology to provision one or more of identification information, an application, a security key, and a credential for the electronic ID 123 over the secure communication path. In some embodiments, the wired docking station 121 may include technology to set a duration period, and invalidate one or more of the identification information, the application, the security key, and the credential for the electronic identification badge upon expiration of the duration period. For example, the wired docking station 121 may exchange information related to the electronic ID 123 with the provisioning authority 122 and receive provisioning information from the provisioning authority 122 for the electronic ID 123. The wired docking station 121 may then provision the electronic ID 123 based on the provisioning information received from the provisioning authority 122.

Figure 10C:
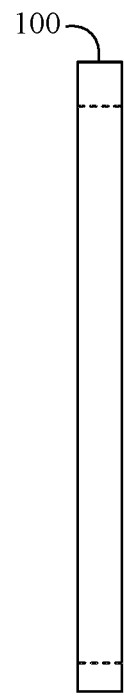
Figure 10C:
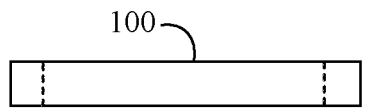
Figure 13:
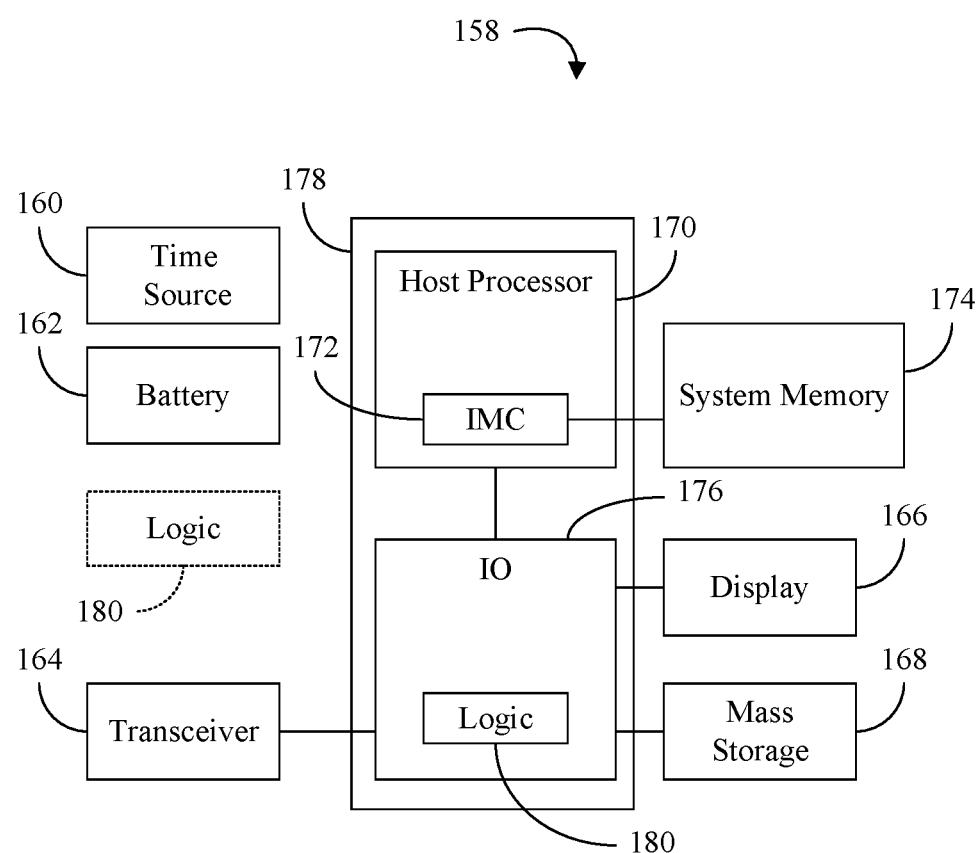
FIG. 13 is a block diagram of an example of a computing device according to an embodiment.

FIG. 13 shows a computing device 158 that may be readily substituted for one or more of the electronic ID badge 10 (FIG. 1), the electronic ID badge 40 (FIG. 4), the electronic ID badge 50 (FIG. 5), the electronic ID badge 100 (FIG. 10), the wireless docking station 111 (FIG. 11), and/or the wired docking station 121 (FIG. 12), already discussed. In the illustrated example, the device 158 includes a time source 160 (e.g., crystal oscillator, clock), a battery 162 to supply power to the device 158, a transceiver 164 (e.g., wireless or wired), a display 166 and mass storage 168 (e.g., hard disk drive/HDD, solid state disk/SSD, optical disk, flash memory). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 also includes an input output (IO) module 176 implemented together with the processor 170 on a semiconductor die 178 as a system on chip (SoC), wherein the IO module 176 functions as a host device and may communicate with, for example, the display 166, the transceiver 164, the mass storage 168, and so forth. The mass storage 168 may include non-volatile memory (NVM) that stores one or more keys (e.g., MAC generation keys, encryption keys).

The IO module 176 may include logic 180 that causes the semiconductor die 178 to operate as an electronic ID badge such as, for example, the electronic ID badge 10 (FIG. 1), the electronic ID badge 40 (FIG. 4), the electronic ID badge 50 (FIG. 5), the electronic ID badge 100 (FIG. 10), the wireless docking station 111 (FIG. 11), and/or the wired docking station 121 (FIG. 12). Thus, the logic 180 may to determine if one or more co-located radio transmitters and radio receivers are in a tracked area, enable an active tracking mode if one or more of the co-located radio transmitters and radio receivers are determined to be in the tracked area, and periodically transmit identification information from at least one of the radio transmitters if the active tracking mode is enabled. In some embodiments, the logic 180 may be further configured to disable the active tracking mode if one or more of the co-located radio transmitters and radio receivers are determined to not be in the tracked area, place a processor, memory, and the co-located radio transmitters and radio receivers in a sleep mode when the active tracking mode is disabled, and periodically wake from the sleep mode to determine if one or more of the co-located radio transmitters and radio receivers are in the tracked area. For example, the logic 180 may also be configured to wake from the sleep mode in response to a read event to determine if one or more of the co-located radio transmitters and radio receivers are in the tracked area. In some embodiments, the logic 180 may be further configured to periodically store time information and external transmitter information received by one or more of the radio receivers if the active tracking mode is enabled. In any of the embodiments herein, the logic 180 may also be configured to cause a name and image of a user associated with the identification information to be displayed. For example, the one or more co-located radio transmitters and radio receivers may include one or more of a WIFI radio, a GPS receiver, a cellular radio, and a RFID tag.

Alternatively, the logic 180 may authenticate an electronic identification badge, establish a secure communication path with the electronic identification badge, and provision the electronic identification badge over the secure communication path. For example, the logic 180 may be configured to provision one or more of identification information, an application, a security key, and a credential for the electronic identification badge over the secure communication path. In some embodiments, the logic 180 may be further configured to set a duration period, and invalidate one or more of the identification information, the application, the security key, and the credential for the electronic identification badge upon expiration of the duration period. For example, the logic 180 may be housed in a docking station.

In one example, the time source 160 is autonomous/independent from the controller in order to enhance security (e.g., to prevent the controller from tampering with cadence, frequency, latency and/or timestamp data). The logic 180 may also be implemented elsewhere in the device 158.

Figure 14:
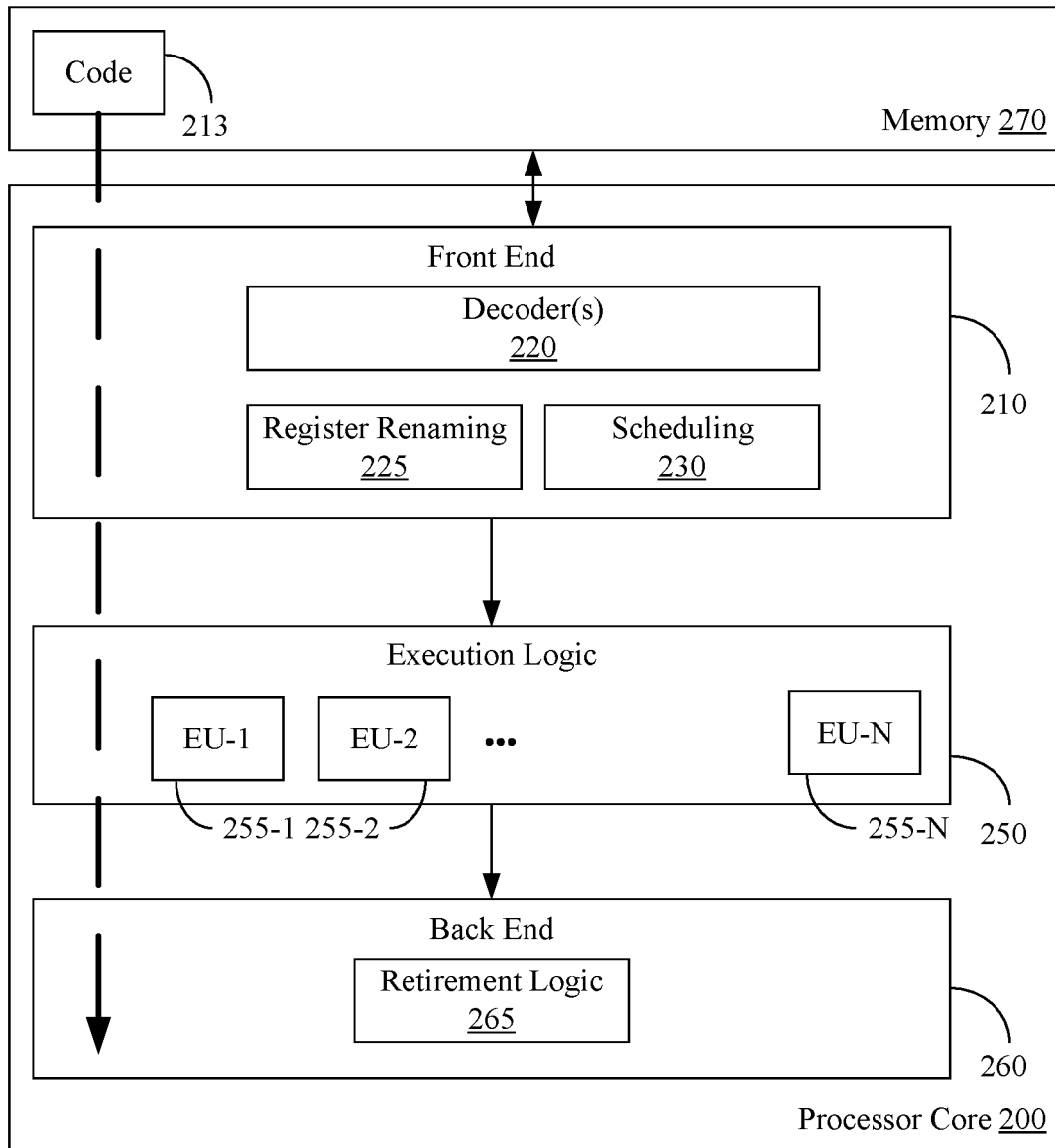
FIG. 14 is a block diagram of an example of a processor according to an embodiment.

FIG. 14 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 14, a processing element may alternatively include more than one of the processor core 200 illustrated in FIG. 14. The processor core 200 may be a single-threaded core or, for at least one embodiment, the processor core 200 may be multithreaded in that it may include more than one hardware thread context (or "logical processor") per core.

FIG. 14 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIGS. 3A to 3C), the method 60, and/or the method 90, already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 14, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 15:
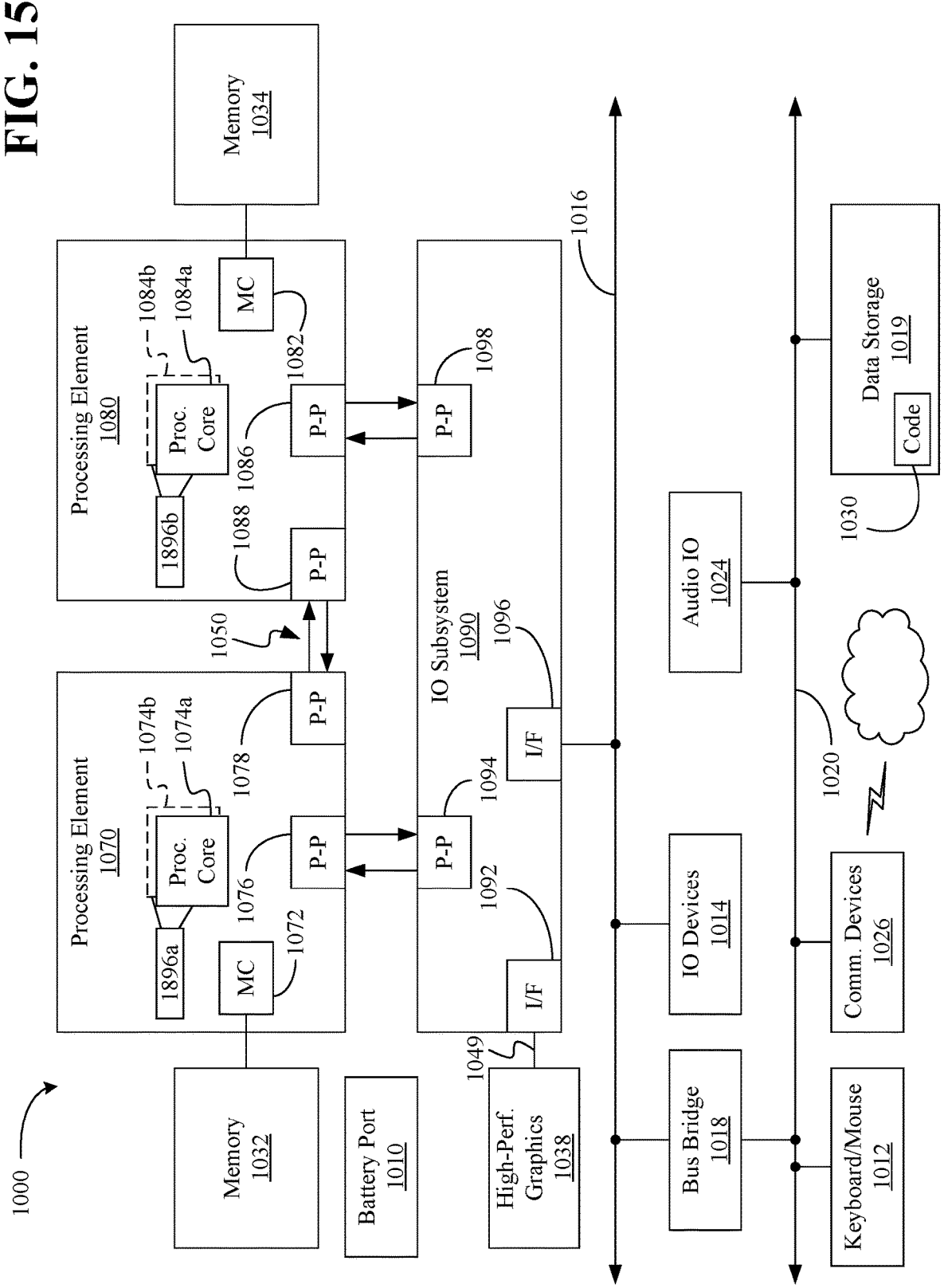
FIG. 15 is a block diagram of an example of a computing system according to an embodiment.

Referring now to FIG. 15, shown is a block diagram of a computing system 1000 embodiment in accordance with an embodiment. Shown in FIG. 15 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 15 may be implemented as a multi-drop bus rather than point-to-point interconnect.

As shown in FIG. 15, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 14.

Each processing element 1070, 1080 may include at least one shared cache 1896*a*, 1896*b*. The shared cache 1896*a*,

1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 15, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 15, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 15, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIGS. 3A to 3C), the method 60, and/or the method 90, already discussed, and may be similar to the code 213 (FIG. 14), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 15, a system may implement a multi-drop bus or another such communication topology. Also, the elements of FIG. 15 may alternatively be partitioned using more or fewer integrated chips than shown in FIG. 15.

Additional Notes and Examples

Example 1 may include an electronic identification badge, comprising a housing having a card form factor, a processor positioned within the housing, memory positioned within the housing and communicatively coupled to the processor, one or more radio transmitters positioned within the housing and communicatively coupled to the processor, one or more radio receivers positioned within the housing and communicatively coupled to the processor, and logic positioned within the housing and communicatively coupled to the processor to determine if one or more of the radio transmitters and the radio receivers are in a tracked area, enable an active tracking mode if one or more of the radio transmitters and the radio receivers are determined to be in the tracked area, and periodically transmit identification information from at least one of the radio transmitters if the active tracking mode is enabled.

Example 2 may include the badge of Example 1, wherein the logic is further to disable the active tracking mode if one or more of the radio transmitters and the radio receivers are determined to not be in the tracked area, place the processor, memory, radio transmitters, and radio receivers in a sleep mode when the active tracking mode is disabled, and periodically wake from the sleep mode to determine if one or more of the radio transmitters and the radio receivers are in the tracked area.

Example 3 may include the badge of Example 2, wherein the logic is further to wake from the sleep mode in response to a read event to determine if one or more of the radio transmitters and the radio receivers are in a tracked area.

Example 4 may include the badge of Example 1, wherein the logic is further to periodically store time information and external transmitter information received by one or more of the radio receivers if the active tracking mode is enabled.

Example 5 may include the badge of any of Examples 1 to 4, further comprising a display affixed to the housing and communicatively coupled to the processor to display a name and image of a user associated with the identification information.

Example 6 may include the badge of any of Examples 1 to 5, wherein the radio transmitters and receivers include one or more of a WIFI radio, a Global Positioning System (GPS) receiver, a cellular radio, and a radio frequency identifier (RFID) tag.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to determine if one or more co-located radio transmitters and radio receivers are in a tracked area, enable an active tracking mode if one or more of the co-located radio transmitters and radio receivers are determined to be in the tracked area, and periodically transmit identification information from at least one of the radio transmitters if the active tracking mode is enabled.

Example 8 may include the apparatus of Example 7, wherein the logic is further to disable the active tracking mode if one or more of the co-located radio transmitters and radio receivers are determined to not be in the tracked area, place a processor, memory, and the co-located radio transmitters and radio receivers in a sleep mode when the active tracking mode is disabled, and periodically wake from the sleep mode to determine if one or more of the co-located radio transmitters and radio receivers are in the tracked area.

Example 9 may include the apparatus of Example 8, wherein the logic is further to wake from the sleep mode in response to a read event to determine if one or more of the co-located radio transmitters and radio receivers are in the tracked area.

Example 10 may include the apparatus of Example 7, wherein the logic is further to periodically store time information and external transmitter information received by one or more of the radio receivers if the active tracking mode is enabled.

Example 11 may include the apparatus of any of Examples 7 to 10, wherein the logic is further to: cause a name and image of a user associated with the identification information to be displayed.

Example 12 may include the apparatus of any of Examples 7 to 11, wherein the one or more co-located radio transmitters and radio receivers include one or more of a WIFI radio, a Global Positioning System (GPS) receiver, a cellular radio, and a radio frequency identifier (RFID) tag.

Example 13 may include the apparatus of any of Examples 7 to 12, wherein the logic coupled to the one or more substrates includes transistor channel regions that are positioned within the one or more substrates.

Example 14 may include a method of tracking a location, comprising determining if one or more co-located radio transmitters and radio receivers are in a tracked area, enabling an active tracking mode if one or more of the co-located radio transmitters and radio receivers are determined to be in the tracked area, and periodically transmitting identification information from at least one of the radio transmitters if the active tracking mode is enabled.

Example 15 may include the method of Example 14, further comprising disabling the active tracking mode if one or more of the co-located radio transmitters and radio receivers are determined to not be in the tracked area, placing a processor, memory, and the co-located radio transmitters and radio receivers in a sleep mode when the active tracking mode is disabled, and periodically waking from the sleep mode to determine if one or more of the co-located radio transmitters and radio receivers are in the tracked area.

Example 16 may include the method of Example 15, further comprising waking from the sleep mode in response to a read event to determine if one or more of the co-located radio transmitters and radio receivers are in the tracked area.

Example 17 may include the method of Example 14, further comprising periodically storing time information and external transmitter information received by one or more of the radio receivers if the active tracking mode is enabled.

Example 18 may include the method of any of Examples 14 to 17, further comprising displaying a name and image of a user associated with the identification information.

Example 19 may include the method of any of Examples 14 to 18, wherein the one or more co-located radio transmitters and radio receivers include one or more of a WIFI radio, a Global Positioning System (GPS) receiver, a cellular radio, and a radio frequency identifier (RFID) tag.

Example 20 may include at least one computer readable storage medium, comprising a set of instructions, which when executed by a computing device, cause the computing device to determine if one or more co-located radio transmitters and radio receivers are in a tracked area, enable an active tracking mode if one or more of the co-located radio transmitters and radio receivers are determined to be in the tracked area, and periodically transmit identification information from at least one of the radio transmitters if the active tracking mode is enabled.

Example 21 may include the at least one computer readable storage medium of Example 20, comprising a further set of instructions, which when executed by the computing device, cause the computing device to disable the active tracking mode if one or more of the co-located radio transmitters and radio receivers are determined to not be in the tracked area, place a processor, memory, and the co-located radio transmitters and radio receivers in a sleep mode when the active tracking mode is disabled, and periodically wake from the sleep mode to determine if one or more of the co-located radio transmitters and radio receivers are in the tracked area.

Example 22 may include the at least one computer readable storage medium of Example 21, comprising a further set of instructions, which when executed by the computing device, cause the computing device to wake from the sleep mode in response to a read event to determine if one or more of the co-located radio transmitters and radio receivers are in the tracked area.

Example 23 may include the at least one computer readable storage medium of Example 20, comprising a further set of instructions, which when executed by the computing device, cause the computing device to periodically store time information and external transmitter information received by one or more of the radio receivers if the active tracking mode is enabled.

Example 24 may include the at least one computer readable storage medium of any of Examples 20 to 23, comprising a further set of instructions, which when executed by the computing device, cause the computing device to display a name and image of a user associated with the identification information.

Example 25 may include the at least one computer readable storage medium of any of Examples 20 to 24, wherein the one or more co-located radio transmitters and radio receivers include one or more of a WIFI radio, a Global Positioning System (GPS) receiver, a cellular radio, and a radio frequency identifier (RFID) tag.

Example 26 may include a location tracker apparatus, comprising means for determining if one or more co-located radio transmitters and radio receivers are in a tracked area, means for enabling an active tracking mode if one or more of the co-located radio transmitters and radio receivers are determined to be in the tracked area, and means for periodically transmitting identification information from at least one of the radio transmitters if the active tracking mode is enabled.

Example 27 may include the apparatus of Example 26, further comprising means for disabling the active tracking mode if one or more of the co-located radio transmitters and radio receivers are determined to not be in the tracked area, means for placing a processor, memory, and the co-located radio transmitters and radio receivers in a sleep mode when the active tracking mode is disabled, and means for periodically waking from the sleep mode to determine if one or more of the co-located radio transmitters and radio receivers are in the tracked area.

Example 28 may include the apparatus of Example 27, further comprising means for waking from the sleep mode in response to a read event to determine if one or more of the co-located radio transmitters and radio receivers are in the tracked area.

Example 29 may include the apparatus of Example 26, further comprising means for periodically storing time information and external transmitter information received by one or more of the radio receivers if the active tracking mode is enabled.

Example 30 may include the apparatus of any of Examples 26 to 29, further comprising means for displaying a name and image of a user associated with the identification information.

Example 31 may include the apparatus of any of Examples 26 to 30, wherein the one or more co-located radio transmitters and radio receivers include one or more of a WIFI radio, a Global Positioning System (GPS) receiver, a cellular radio, and a radio frequency identifier (RFID) tag.

Example 32 may include an electronic processing system, comprising a processor, memory communicatively coupled to the processor, and logic communicatively coupled to the processor to authenticate an electronic identification badge, establish a secure communication path with the electronic identification badge, and provision the electronic identification badge over the secure communication path.

Example 33 may include the system of Example 32, wherein the logic is further to provision one or more of identification information, an application, a security key, and a credential for the electronic identification badge over the secure communication path.

Example 34 may include the system of Example 33, wherein the logic if further to set a duration period, and invalidate one or more of the identification information, the application, the security key, and the credential for the electronic identification badge upon expiration of the duration period.

Example 35 may include the system of any of Examples 32 to 34, wherein the logic is housed in a docking station.

Example 36 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to authenticate an electronic identification badge, establish a secure communication path with the electronic identification badge, and provision the electronic identification badge over the secure communication path.

Example 37 may include the apparatus of Example 36, wherein the logic is further to provision one or more of identification information, an application, a security key, and a credential for the electronic identification badge over the secure communication path.

Example 38 may include the apparatus of Example 37, wherein the logic if further to set a duration period, and invalidate one or more of the identification information, the application, the security key, and the credential for the electronic identification badge upon expiration of the duration period.

Example 39 may include the apparatus of any of Examples 36 to 38, wherein the logic is housed in a docking station.

Example 40 may include the apparatus of any of Examples 36 to 39, wherein the logic coupled to the one or more substrates includes transistor channel regions that are positioned within the one or more substrates.

Example 41 may include a method of provisioning an electronic identification badge, comprising authenticating an electronic identification badge, establishing a secure communication path with the electronic identification badge, and provisioning the electronic identification badge over the secure communication path.

Example 42 may include the method of Example 41, further comprising provisioning one or more of identification information, an application, a security key, and a credential for the electronic identification badge over the secure communication path.

Example 43 may include the method of Example 42, further comprising setting a duration period, and invalidating one or more of the identification information, the application, the security key, and the credential for the electronic identification badge upon expiration of the duration period.

Example 44 may include the method of any of Examples 41 to 43, further comprising physically supporting the electronic identification badge on a docking station.

Example 45 may include at least one computer readable storage medium, comprising a set of instructions, which when executed by a computing device, cause the computing device to authenticate an electronic identification badge, establish a secure communication path with the electronic identification badge, and provision the electronic identification badge over the secure communication path.

Example 46 may include the at least one computer readable storage medium of Example 45, comprising a further set of instructions, which when executed by the computing device, cause the computing device to provision one or more of identification information, an application, a security key, and a credential for the electronic identification badge over the secure communication path.

Example 47 may include the at least one computer readable storage medium of Example 46, comprising a further set of instructions, which when executed by the computing device, cause the computing device to set a duration period, and invalidate one or more of the identification information, the application, the security key, and the credential for the electronic identification badge upon expiration of the duration period.

Example 48 may include a docking station apparatus, comprising means for authenticating an electronic identification badge, means for establishing a secure communication path with the electronic identification badge, and means for provisioning the electronic identification badge over the secure communication path.

Example 49 may include the apparatus of Example 48, further comprising means for provisioning one or more of identification information, an application, a security key, and a credential for the electronic identification badge over the secure communication path.

Example 50 may include the apparatus of Example 49, further comprising means for setting a duration period, and means for invalidating one or more of the identification information, the application, the security key, and the credential for the electronic identification badge upon expiration of the duration period.

Example 51 may include the apparatus of any of Examples 48 to 50, further comprising means for physically supporting the electronic identification badge.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited because other modifications will become apparent to the skilled practitioner upon a study of the drawings, specification, and following claims.

I claim:

1. An electronic identification badge, comprising:
a housing having a card form factor;
a processor positioned within the housing;
memory positioned within the housing and communicatively coupled to the processor;
one or more radio transmitters positioned within the housing and communicatively coupled to the processor;
one or more radio receivers positioned within the housing and communicatively coupled to the processor;
logic positioned within the housing and communicatively coupled to the processor to:
receive provisioned information including one or more of identification information, an application, a security key, or a credential for the electronic identification badge,
receive a duration period for the provisioned information,
determine a location of the badge,
determine, based on the location of the badge, if one or more of the radio transmitters and the radio receivers are in a tracked area,
enable an active tracking mode if one or more of the radio transmitters and the radio receivers are determined to be in the tracked area,
periodically transmit the identification information from at least one of the radio transmitters if the active tracking mode is enabled; and
invalidate, upon expiration of the duration period, one or more of the identification information, the application, the security key, or the credential, and
a display affixed to the housing and communicatively coupled to the processor to display a name and image of a user associated with the identification information.

2. The badge of claim 1, wherein the logic is further to:
disable the active tracking mode if one or more of the radio transmitters and the radio receivers are determined to not be in the tracked area;
place the processor, memory, radio transmitters, and radio receivers in a sleep mode when the active tracking mode is disabled; and
periodically wake from the sleep mode to determine if one or more of the radio transmitters and the radio receivers are in the tracked area.

3. The badge of claim 2, wherein the logic is further to:
wake from the sleep mode in response to a read event to determine if one or more of the radio transmitters and the radio receivers are in a tracked area.

4. The badge of claim 1, wherein the logic is further to:
periodically store time information and external transmitter information received by one or more of the radio receivers if the active tracking mode is enabled.

5. The badge of claim 1, wherein the radio transmitters and receivers include one or more of a WIFI radio, a Global Positioning System (GPS) receiver, a cellular radio, and a radio frequency identifier (RFID) tag, wherein the location of the badge is to be determined using location data from one or more of the WIFI radio, the GPS receiver, and the cellular radio, and wherein the identification information is to be determined independently from the location of the badge using the RFID tag.

6. A semiconductor package apparatus, comprising:
one or more substrates positioned within an electronic identification badge; and logic coupled to the one or more substrates, wherein the logic is at least partly implemented in one or more of configurable logic and fixed-functionality hardware logic positioned within the badge, the logic coupled to the one or more substrates to:
receive provisioned information including one or more of identification information, an application, a security key, or a credential for the electronic identification badge,
receive a duration period for the provisioned information,
determine a location of the badge,
determine, based on the location of the badge, if one or more co-located radio transmitters and radio receivers are in a tracked area,
enable an active tracking mode if one or more of the co-located radio transmitters and radio receivers are determined to be in the tracked area,
periodically transmit the identification information from at least one of the radio transmitters if the active tracking mode is enabled, and
invalidate, upon expiration of the duration period, one or more of the identification information, the application, the security key, or the credential, and
cause a name and image of a user associated with the identification information to be displayed.

7. The apparatus of claim 6, wherein the logic is further to:
disable the active tracking mode if one or more of the co-located radio transmitters and radio receivers are determined to not be in the tracked area;
place a processor, memory, and the co-located radio transmitters and radio receivers in a sleep mode when the active tracking mode is disabled; and
periodically wake from the sleep mode to determine if one or more of the co-located radio transmitters and radio receivers are in the tracked area.

8. The apparatus of claim 7, wherein the logic is further to:
wake from the sleep mode in response to a read event to determine if one or more of the co-located radio transmitters and radio receivers are in the tracked area.

9. The apparatus of claim 6, wherein the logic is further to:
periodically store time information and external transmitter information received by one or more of the radio receivers if the active tracking mode is enabled.

10. The apparatus of claim 6, wherein the one or more co-located radio transmitters and radio receivers include one or more of a WIFI radio, a Global Positioning System (GPS) receiver, a cellular radio, and a radio frequency identifier (RFID) tag, wherein the location is to be determined using location data from one or more of the WIFI radio, the GPS receiver, and the cellular radio, and wherein the identification information is to be determined independently from the location using the RFID tag.

11. The apparatus of claim 6, wherein the logic coupled to the one or more substrates includes transistor channel regions that are positioned within the one or more substrates.

12. A method of tracking a location, comprising:
determining, by an electronic identification badge, a location of the badge, wherein the badge includes provisioned information including one or more of identification information, an application, a security key, a credential for the electronic identification badge, and a duration period for the provisioned information;
determining, based on the location of the badge, if one or more co-located radio transmitters and radio receivers positioned within the badge are in a tracked area;
enabling an active tracking mode if one or more of the co-located radio transmitters and radio receivers are determined to be in the tracked area;
periodically transmitting the identification information from at least one of the radio transmitters if the active tracking mode is enabled;
invalidating, upon expiration of the duration period, one or more of the identification information, the application, the security key, or the credential; and
displaying a name and image of a user associated with the identification information.

13. The method of claim 12, further comprising:
disabling the active tracking mode if one or more of the co-located radio transmitters and radio receivers are determined to not be in the tracked area;
placing a processor, memory, and the co-located radio transmitters and radio receivers in a sleep mode when the active tracking mode is disabled; and
periodically waking from the sleep mode to determine if one or more of the co-located radio transmitters and radio receivers are in the tracked area.

14. The method of claim 13, further comprising:
waking from the sleep mode in response to a read event to determine if one or more of the co-located radio transmitters and radio receivers are in the tracked area.

15. The method of claim 12, further comprising:
periodically storing time information and external transmitter information received by one or more of the radio receivers if the active tracking mode is enabled.

16. The method of claim 12, wherein the one or more co-located radio transmitters and radio receivers include one or more of a WIFI radio, a Global Positioning System (GPS) receiver, a cellular radio, and a radio frequency identifier (RFID) tag, wherein the location of the badge is to be determined using location data from one or more of the WIFI radio, the GPS receiver, and the cellular radio, and wherein the identification information is to be determined independently from the location of the badge using the RFID tag.

17. At least one non-transitory computer readable storage medium, comprising a set of instructions, which when executed by a computing device, cause the computing device to:
determine, by an electronic identification badge, a location of the badge, wherein the badge includes provisioned information including one or more of identification information, an application, a security key, a credential for the electronic identification badge, and a duration period for the provisioned information;
determine, based on the location of the badge, if one or more co-located radio transmitters and radio receivers positioned within the badge are in a tracked area;
enable an active tracking mode if one or more of the co-located radio transmitters and radio receivers are determined to be in the tracked area;
periodically transmit the identification information from at least one of the radio transmitters if the active tracking mode is enabled;
invalidating, upon expiration of the duration period, one or more of the identification information, the application, the security key, or the credential; and
display a name and image of a user associated with the identification information.

18. The at least one non-transitory computer readable storage medium of claim 17, comprising a further set of instructions, which when executed by the computing device, cause the computing device to:
- disable the active tracking mode if one or more of the co-located radio transmitters and radio receivers are determined to not be in the tracked area;
- place a processor, memory, and the co-located radio transmitters and radio receivers in a sleep mode when the active tracking mode is disabled; and
- periodically wake from the sleep mode to determine if one or more of the co-located radio transmitters and radio receivers are in the tracked area.

19. The at least one non-transitory computer readable storage medium of claim 18, comprising a further set of instructions, which when executed by the computing device, cause the computing device to:
- wake from the sleep mode in response to a read event to determine if one or more of the co-located radio transmitters and radio receivers are in the tracked area.

20. The at least one non-transitory computer readable storage medium of claim 17, comprising a further set of instructions, which when executed by the computing device, cause the computing device to:
- periodically store time information and external transmitter information received by one or more of the radio receivers if the active tracking mode is enabled.

21. The at least one non-transitory computer readable storage medium of claim 17, wherein the one or more co-located radio transmitters and radio receivers include one or more of a WIFI radio, a Global Positioning System (GPS) receiver, a cellular radio, and a radio frequency identifier (RFID) tag, wherein the location of the badge is to be determined using location data from one or more of the WIFI radio, the GPS receiver, and the cellular radio, and wherein the identification information is to be determined independently from the location of the badge using the RFID tag.

* * * * *